United States Patent [19]
Edwards

[11] 4,028,619
[45] June 7, 1977

[54] POSITION LOCATING USING DIGITAL LOGIC CONTROLLED BY PULSE PROPAGATION TIME INTERVALS

[75] Inventor: Gerald L. Edwards, Seattle, Wash.

[73] Assignee: CX Corporation, Seattle, Wash.

[22] Filed: Sept. 22, 1975

[21] Appl. No.: 615,387

[52] U.S. Cl. .......................... 324/34 PS; 333/30 M
[51] Int. Cl.² .................................... G01R 33/12
[58] Field of Search ......... 324/34 R, 34 MA, 34 D, 324/34 PS; 333/30 R, 30 M

[56] References Cited
UNITED STATES PATENTS

| | | | |
|---|---|---|---|
| 2,656,714 | 10/1953 | Cartier | 333/30 M |
| 3,423,673 | 1/1969 | Bailey et al. | 324/34 R |
| 3,898,555 | 8/1975 | Tellerman | 324/34 D |

FOREIGN PATENTS OR APPLICATIONS 661,049  11/1951  United Kingdom ............. 333/30 R

OTHER PUBLICATIONS

Bradburd, E. M.; Magnetostructive Delay Line; Elec. Comm.; Mar. 1951; pp. 46–53.

*Primary Examiner*—Robert J. Corcoran
*Attorney, Agent, or Firm*—Christensen, O'Connor, Garrison & Havelka

[57] ABSTRACT

Apparatus for gauging location of a movable element in relation to an end of an elongated impulse wave energy propagative member employing a sensing transducer adjacent one end of the member to sense first the direct impulse and thereafter the indirect impulse that is reflected from the opposite end. Processing of the sensing transducer responses and sequentially programmed digital measurement of time intervals associated with the duration and time relationship of such responses according to logic equations affords the desired location indication with automatic compensation for ambiently caused variations in shock wave propagation velocity in the member on repeating cycles of operation and with measurement accuracy independent of undue precision requirements in location of the sensing transducer in relation to the adjacent end of the member.

13 Claims, 3 Drawing Figures

POSITION LOCATING USING DIGITAL LOGIC CONTROLLED BY PULSE PROPAGATION TIME INTERVALS

BACKGROUND OF THE INVENTION

This invention relates to precision control and/or measurement of location of a movable element in relation to a fixed point, and more particularly to the achievement thereof using time interval measurement techniques applied to an elongated magnetostrictive rod or other energy propagative member affording a basis for manual or electrical control and/or remote indication and control of the movable element's position. The invention is herein illustratively described in its presently preferred embodiment suitable, for example, to control positioning of a film or print strip in relation to a cutter used in commerical photographic film processing laboratories in cases where the strip is not pre-notched or otherwise marked as a basis to time the operation of the cutter as a function of strip feed position. However, it will be evident that the invention is applicable in other forms and to other uses without departure from its essential features.

Certain problems in precision distance measurement using energy propagation members include problems arising from attempts to terminate the member at one or both ends in its characteristic impedance so as to avoid energy reflections. An object hereof is to circumvent these difficulties and in fact to employ terminations that produce reflections, primary ones of which (first in time) are utilized in the time interval measurement process.

Still other problems imposing restriction on measurement accuracy have indirectly to do with end reflections in the propagative member, but more especially to sensing transducer placement which will yield unambiguous and accurate wave energy sensing responses without an unduly critical positioning requirement as regards forming and locating the sensing transducer along the member. A further object hereof, therefore, is to overcome such difficulties in an improved locating apparatus, and one which is capable of ignoring or rejecting from its sensing transducer responses both spurious signals and responses attributable to ringing effects in the member, that is attenuated energy reflections occurring subsequent to those first two response signals actually employed in the measurement logic implementation.

Still another objective hereof is to provide such a system that automatically compensates for changes in shock wave propagation velocity in the member attributable to ambient temperature or other effects that otherwise disturb the calibration based on propagation time interval between fixed points along the member.

In accordance with another object of this invention, program logic and a digital counting system controlled thereby, provide time interval measurements digitally indicating movable element position with a high degree of precision. Furthermore, it is an object to achieve the same degree of precision using digital circuit elements common to those used in the basic measurement, to provide continuing (i.e. cycle-to-cycle) compensation for changes in shock wave propagation velocity in the member.

These and other objectives and advantages of the invention, including its inherent simplicity, ease of practical manufacture and operation, versatility for various uses and in varying forms will become evident from an understanding of its preferred embodiment hereinafter disclosed.

BRIEF DESCRIPTION OF INVENTION

In its illustrative embodiment, the invention utilizes an elongated magnetrostrictive rod that has a phase-inverting reflective terminal (restraint) at one end and a noninverting reflective opposite (free) end, with localized energy shock-inducing transducer means producing bi-directional energy propagation in the rod carried by the movable element whose location is to be measured or controlled, and a propagative shock wave sensing transducer stationarily mounted adjacent the rod's free end. In accordance with one important feature the sensing transducer's location proximate to the free end of the rod is such as to produce a composite single response signal from the additive overlapping effects of incident wave energy in its two traversals of the transducer, namely as it first approaches the end of the rod and as it reflects back, reversed in phase, from such end. By processing such composite single response in a minimum threshold (spurious and attenuated reflection signal-rejecting) input amplifier that squares its form, an output signal is generated centered in time on the instant of arrival of the shock wave energy peak at the rod's free end.

As a further feature, the foregoing processed single composite response signal provided by such amplifier is utilized in the time interval measurement logic processing on the signal's first two successive occurrences in the system during each operating cycle, namely upon incidence of the direct wave and on incidence of the first reflected (noninverted) wave resulting from the bi-directional propagation from the shock induction transducer.

Logic processing of certain time intervals associated with these two signal occurrences in a digital counting system operating a position read-out indicator is preformed by a program control generator controlling a first counter to count the output of a separate frequency source. The counting program in turn is controlled by the squared waves from the sensing signal amplifier so as to accumulate counts at full or fractional rates at different times in the total cycle following the logic equation. The accumulated total count is then related to time, hence distance, between squared wave signal time centers. A second counter also program-controlled by a logic system and counting from the same frequency source provides a digital measure of instantaneous end-to-end propagation interval that is compared with a fixed reference count in order to vary source frequency in a manner that compensates for ambiently caused changes in shock wave propagation velocity in the rod.

These and other features and combinations of features comprising the invention will be more fully understood from the description that follows.

DESCRIPTION REFERENCED TO DRAWINGS

Figures 1, 2:
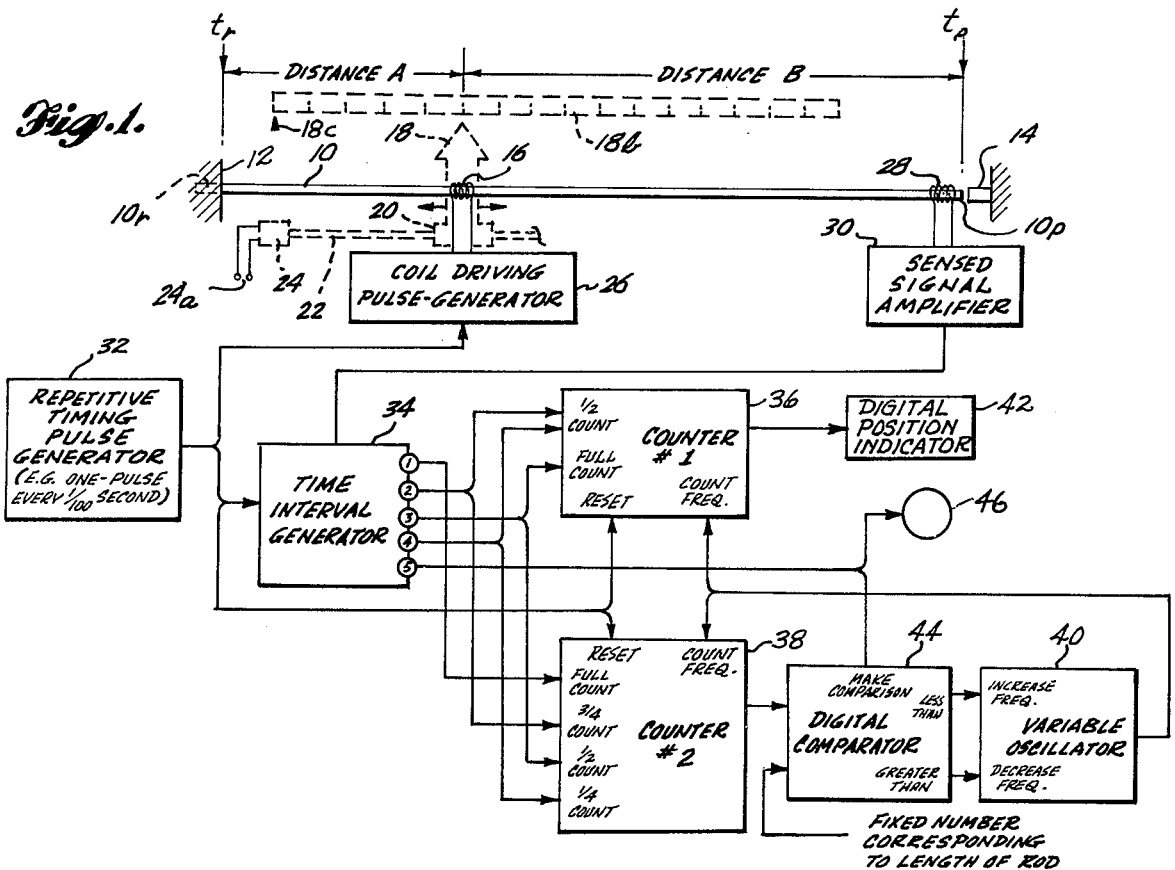
FIG. 1 is a schematic diagram of the preferred embodiment.
FIG. 2 is a wave diagram illustrating composite signal formation in the sensing transducer and processing thereof by its signal amplifier.

Referring to the drawings, the invention provides a highly accurate system for locating or measuring the location of a movable element 18 along a path such as that defined by elongated magnetostrictive rod 10. It achieves this result free of the effects of changes in ambient conditions such as temperature, and is relatively noncritical with relation to physical construction tolerances. For example, its accuracy is attained without necessity of critically designed physical terminations (i.e., characteristic impedance or reflectionless terminations) of the rod as a wave energy propagative medium. Nor do the exact form and placement of the excitation transducer 16 carried by element 18 or that of the sensing transducer 28 fixed in position closely adjacent one end of the rod affect the accuracy of the system.

In brief general terms, the system operates by periodic impulse energization of coil 16 inducing a brief local compressional shock in the magnetostrictive rod 10 that then propagates bi-directionally from the coil. Transducer 28 senses first the direct shock wave and thereafter the indirect shock wave, i.e. that reflected from the opposite end of the rod. By processing the sensed shock signals from transducer coil 28 and digitally measuring certain time intervals associated with their occurrences and their relationship in time to the original shock excitation of the rod in cyclical manner a continuing accurate determination is established and/or indicated of the exact location of element 18 along the rod 10. This digitally precise determination of location of a movable element has, of course, many and diverse applications prominent among which is in photographic processing. There it may be used, for example, to provide a digital representation of the exact distance between a desired cutting line across a filmstrip or print strip and a stationary cutter (18c). The act of setting a movable cursor, and thereby the excitation transducer, at the desired cutting location along the strip ahead of the cutter causes the apparatus to produce a digital output that may be fed to an indicator or a digitally controlled feed mechanism (24) so as to advance the strip by precisely the measured distance before the cutter operates.

In the illustrated embodiment, the wave propagative member is in the form of an elongated magnetostricitve rod 10 and the form of propagational wave energy used in the system is a direct impulse of compressional wave energy. The rod is preferably of uniform cross section throughout its length and has a free end 10p at which incident propagative wave energy is substantially fully reflected. With this end terminating in open air, the reflection occurs with phase reversal of the energy wave or impulse. The rod's opposite end 10r is restrained or held against vibration such that substantially all propagative wave energy incident thereon is reflected without phase reversal. Because the invention directly and efficiently utilizes wave energy reflection from both ends of the rod, it avoids the problems of critical termination as in certain prior devices that relied upon reflectionless or characteristic impedance terminations.

Physical support mounts for the rod are not illustrated in the drawings. They may be of any conventional or suitable design permitting compressionable wave energy propagation longitudinally of the rod with minimal or no reflections occuring from the rod's support mounts. Rod shape in cross section may vary according to specific design requirements or preference, a round cross section being most convenient. Similarly, geometric configuration of the rod in its longitudinal extent is also subject to variation, that shown in the example being rectilinear, but curvilinear shapes are also permitted such as a circular arc, convenient when measuring or controlling arcuate displacement of a movable element. For commercial photographic film processing applications in which the invention originated, however, the rectilinear shape is preferred inasmuch as most processing steps such as notching, marking, printing and/or cutting usually occur with the filmstrip moving in a rectilinear path.

The restrained or clamped end 10r of the rod is shown schematically as being embedded in a rigid body 12, the effective end of the rod thus becoming the junction plane $t_r$ between the rod and the body 12. The body 12 is theoretically a nonabsorptive mass causing complete reflectance of incident energy with essentially zero change of phase of the reflected energy. It will be recognized as a practical matter that some (minor) absorption of incident energy in the body 12 will occur and is permitted. The sensed signal amplifier 30 receiving composite response signals from sensing coil transducer 28 has a minimum acceptance threshold that is exceeded by the primary (i.e., first occurrence and first reflection) signals, but not by sporadic signal components nor by multiple (i.e. subsequent) reflection signals resulting from the primary shock energy impulses still propagating in the rod after the succeeding operating cycle starts. Those occurring in the first or original operating cycle are ignored by the logic program circuit in any case.

A magnetizing or driving coil 16, preferably of short helically wound form closely encircles magnetostrictive rod 10. This coil is connected to be impulse-energized by a discrete repeating direct current impulse from coil-driving pulse generator 26. The latter is periodically triggered by a repetitive timing pulse generator 32 operating at a suitable recurrence frequency, for example at 100 cycles per second. With each such brief impulse of current flowing in coil 16, a symmetrical pattern of magnetic flux is excited in the rod 10 concentrated essentially in a discrete or localized region centered in the coil 16. Due to the magnetostrictive properties of the rod material, the resultant brief magnetizing shock localized in the rod at the precise location of coil 16 produces a corresponding compressive stress shock in the rod that starts propagating simultaneously in both directions along the rod, that is toward both ends of the rod.

The duration of this compressional wave energy shock initially excited in the rod is brief (i.e., a very small fraction, such as one-hundredth, or less), the propagation time of the shock wave from end to end of the rod. It should also represent a small fraction the propagating time to either end of the rod in all adjustive positions of the coil. Coil 16 is mounted and adapted to be moved longitudinally of the rod into any of different adjustive positions. This may be done either manually (as by moving a cursor along a filmstrip as stated earlier) or by remotely controlled positioning means, as shown, or alternatively in response to operation of a servo-mechanism that causes repositioning movement of the coil until the system position measurement signal matches a selected reference or feedback value set into the servo-loop system using any of well-known principles of servo design.

In the illustration, excitation or driving coil 16 is shown mounted on a positioning element 18, 20 that may represent for example a filmstrip cutter or notcher. An elongated helical feed screw 22 paralleling the rod 10 and extending over most of its length engages a carrier nut 20 carrying element 18 and thereby transducer coil 16. The positioning screw 22 is turned in one direction or the other by a reversible-geared electric motor drive unit 24 having electrical input terminals 24a. The designation 18b represents, for example, a graduated scale 18b that cooperates with the illustrated pointer on the coil carriage 18 to visibly indicate coil position along the rod by analog or visual comparison. However, visible indication of coil position in this manner can be merely for verification purposes because the system provides a digital read-out indicator that provides a highly precise numerical reading corresponding to the position of element 18. As another example, 18b represents a photoprint strip to be advanced endwise to a cutter 18c, and the unit 18 a cursor that can be set manually or remotely on a dividing line between successive print frames. The counter output digital value representing cursor position then automatically programs a metered feed device 24 to advance the strip by a precise distance which places the aforesaid dividing line beneath the cutter to assure correctly severing the print.

Functioning in association with the magnetizing or driving coil 16 is a sensing coil 28 located closely adjacent the free or unrestrained end $10_p$ of the magnetostrictive rod. Coil 28 is preferably similar to coil 16 both in form and in its magnetically coupled relationship to rod 10, although its position is fixed in predetermined adjacent relationship to the rod's free end. Magnetic bias flux axially oriented in the rod and linking the coil 28, is produced in the rod's free end $10_p$ by a bias magnet 14 stationarily mounted adjacent such end. Thus, whenever a compressional wave shock wave reaches the rod's end $10_p$ and thereby traverses the coil 28, it varies the magnetic permeability, hence the bias flux linked with sensing coil 28, due to the rod's magnetostrictive properties. This attendant change in magnetic flux density linking coil 28 induces a response in the form of a voltage impulse in coil 28 proportional to the rate of flux change. The resultant voltage signal is applied to sensed signal amplifier 30.

Amplifier 30 is designed, using well-known principles, with a minimum or threshold response level such that spurious and low-level signals are ignored or rejected by amplifier 30. While the interval between pulses from generator 32 can be set long enough to stop ringing in the rod after one measurement cycle before the next one is started, the threshold input level of amplifier 30 will permit use of a shorter interval without intercycle interference. Those primary signals from coil 28 to which the amplifier 30 does respond are squared or clipped as a result of the threshold input level, the high gain and the relatively low saturation level of the amplifier. Thus, amplifier 30 produces a discrete flat-topped or squared wave output signal with each desired shock wave response impulse produced by sensing coil 28. As will be more fully explained hereinafter, the first two such squared waves produced by amplifier 30 following each of the repeating shock excitations of rod 10 by driving coil 16 are used in the location measurement logic. The first of these squared waves results from the shock wave propagating from sensing coil 16 directly to the rod's end $10_p$. The second is the indirect shock wave which arrives at the rod's end $10_p$ after having travelled first from the driving coil 16 to the opposite end $10_r$ where it is reflected (without phase change or reversal) for travel the full length of the rod 10 to the end $10_p$. The logic program ignores any subsequent responses in the same cycles from amplifier 30. By appropriate processing and time interval measurements based on the occurrences of each of these repeating sets of the first two (direct and indirect) shock wave signals in each cycle, extremely accurate digital measurement or determination of position of element 18 is obtained.

Furthermore, by additional time interval measurements and a reference comparison relating these shock wave signals to each other and to time of excitation of coil 16, the system is self-correcting for the magnetostrictive rod's changes in shock wave propagation velocity due, for example, to changes in ambient temperature otherwise affecting accuracy of the position determination function.

The logic programmed squared wave signal processing and time determining functions and circuits will now be described with reference to the drawings including a schematic diagram and timing diagrams. Circuit details are omitted because they are or may be of conventional or well-known design and thus in themselves form no part of the invention. Nor is their verbal description herein considered necessary in order for a person of ordinary skill in the art of digital and timing circuit technology to understand the invention.

Figure 3:
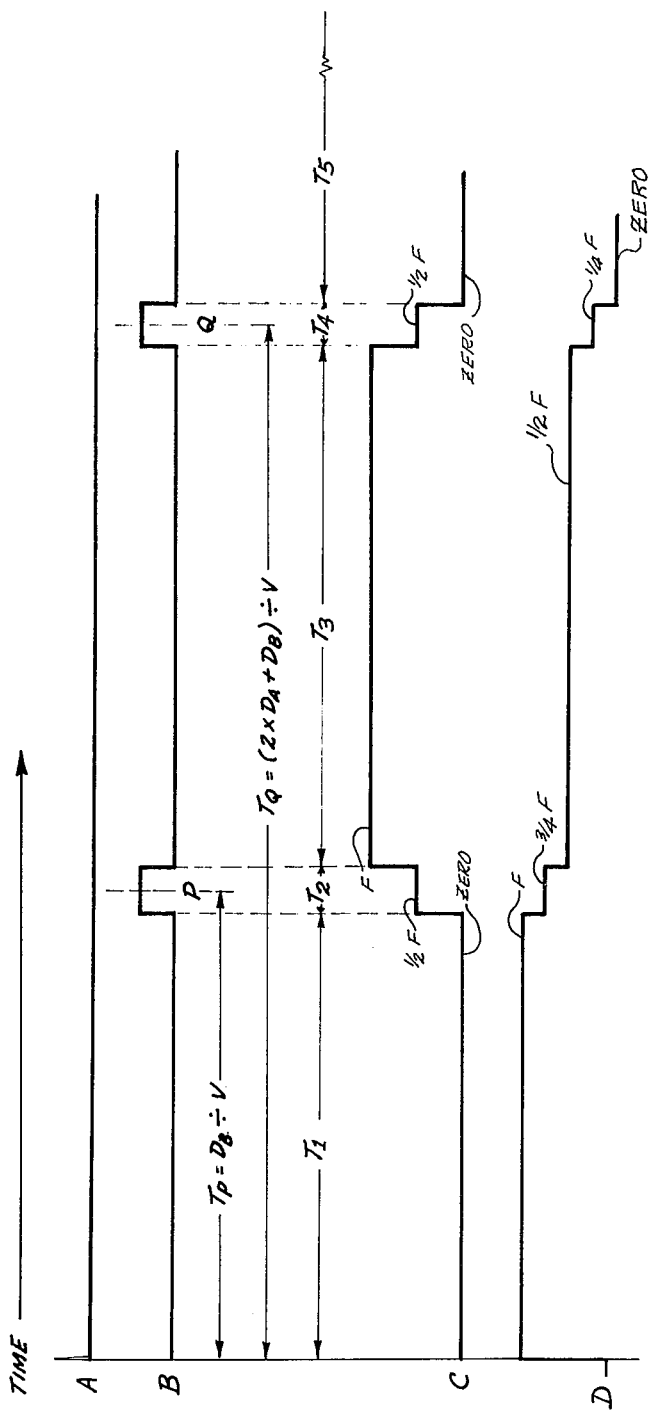
FIG. 3 is a system timing and logic depiction diagram.

The timing diagram (FIG. 3) and governing logic equations that follow herein can best be understood by first describing, in reference to FIG. 2, the nature and function of the sensing transducer coil 28 as a means to produce out of amplifier 30 a squared wave signal of certain propagation time-related characteristics referenced to the effective adjacent end point of magnetostrictive rod 10. FIG. 2A shows the magnetic flux change in coil 28 as an incident shock wave impulse is first traversing the coil. FIG. 2B shows in time relation to FIG. 2A the magnetic flux change in coil 28 as that same incident shock wave is again traversing coil 28 upon reflection from the rod's end face or plane $t_p$. It will be seen that the two overlap in time, and that when the spacing between the coil's center (longitudinally of the rod) and the rod's end plane $t_p$ is optimum the composite magnetic flux change affecting the coil is as shown in FIG. 2C wherein the flux changing downslope of the first merges smoothly with the flux changing downslope of the second. The composite or additive effect on transducer induced voltage is shown in FIG. 2D wherein it will be seen that a single smoothly peaked composite voltage impulse results in the coil 28. Applied to the amplifier 30, the response signal produces a squared wave as shown in FIG. 2E of shorter duration than the positive excursion signal in FIG. 2D, due to the threshold minimum of amplifier 30, it is steep-sided and clipped or flattened, due to the amplifier's high gain and saturation level characteristics. It will be of importance to note that the duration of the squared wave in FIG. 2E is not critical to system performance (nor is that of the inital shock excitation itself), nor is the precise location of the coil 28 in relation to the end plane $t_p$ of rod 10. Although the shape of the composite response effect shown in FIG. 2D will vary somewhat with deviations in position of coil 28 from the optimum, this will not affect the squared wave's center point or form. That center point will continue to coincide substantially with the instant the incident propagating wave peak center arrives at the end plane $t_p$. Thus, there is afforded both a noncritical termination arrangement for rod 10 and a noncritical positioning and design arrangement for a time-position precise sensing transducer capable of detecting, without interfering with, propagation wave incidence upon the end of an interval measuring propagative wave energy member.

In FIG. 3A a trigger pulse is shown on a time scale from repetitive timing pulse generator 32. This starts the measurement cycle. It triggers coil-driving pulse generator 26, starts an operating cycle of an event sequence time interval generator 34 and resets to zero a first digital counter 36 and a second digital counter 38. Each of the latter is receptively connected to a variable (controlled) frequency count pulse generator or variable oscillator 40. As will be explained more fully, the latter's frequency is subject to controlled variation automatically by features of the system in order to compensate for or eliminate the effect of ambient temperature or other disturbances affecting the characteristics, hence the accuracy, of rod 10 as a precision measurement element. Using conventional logic system technology, counter 36 operates a digital position indicator 42 which provides a new and continuing digital base reading of the total cycle count from counter 36 representing position of element 18 at the end of the measurement phase of each operating cycle started by the trigger from generator 32.

In FIG. 3B the two squared waves produced by amplifier 30 appear in time sequence as they occur after each shock excitation of the rod 10 produced by triggering of generator 26. The first of these of a duration $T_2$, has its inception at the end of interval $T_1$, and its center point P (timewise) at the end of interval $T_p = D_B \div V$ (Equation 1), where $D_B$ is the effective distance from the center of transducer 16 to the rod's end plane $t_p$ (FIG. 1) and where $V$ is the shock wave propagation velocity in rod 10. The second of these squared waves, of a duration $T_4$, has its inception at the end of interval $T_3$ which starts at the termination of interval $T_2$, and its center point Q (timewise) at the end of interval $T_Q = (2D_A + D_B) \div V$ (Equation 2), where $D_A$ is the effective distance from the center of transducer 16 to the rod's opposite end plane $t_r$ (FIG. 1). The time interval $T_5$ partially shown in FIG. 3B is the time remaining to the next succeeding cycle trigger pulse similar to that shown in FIG. 3A.

In the following additional numbered equations describing the logic system used in converting interval measurements into a digital indication of position of element 18, "F" represents the count frequency of source 40.

$$T_p = T_1 + \tfrac{1}{2}T_2 \qquad \text{(Eq. 3)}$$

$$T_Q = T_1 + T_2 + T_3 + \tfrac{1}{2}T_4 \qquad \text{(Eq. 4)}$$

By subtracting Equation 1 from Equation 2, $$T_Q - T_P = 2D_A \div V \qquad \text{(Eq. 5)}$$

By halving the sum of Equations 1 and 2, $$\tfrac{1}{2}(T_P + T_Q) = (D_A + D_B) \div V \qquad \text{(Eq. 6)}$$

By substituting Equations 3 and 4 into Equation 5, one derives:

$$\tfrac{1}{2}T_2 + T_3 + \tfrac{1}{2}T_4 = 2D_A \div V \qquad \text{(Eq. 7)}$$

In terms of digital counts tallied by counter 36 at frequency F, Equation 7 represents the final count representing location of the element 18 along rod 10, thus:

$$\tfrac{1}{2}T_2F + T_3F + \tfrac{1}{2}T_4F = 2D_A(F \div V) \qquad \text{(Eq. 8)}$$

Time interval generator 34, is in essence a sequencing program controller that, with counter 36 and source 40, implements the logic cycle of Equation 8 in response to each trigger from timing generator 26 and the ensuing two squared wave signals received from amplifier 30. Referring to Equation 8, during interval $T_2$, the time interval generator 34 through its output No. 2 conditions counter 36 to count at half rate, that is to count every other pulse delivered by oscillator 40 at frequency F. During interval $T_3$ counter 36 is caused by generator 34 through its output No. 3 to count at full rate; whereas during interval $T_4$, it counts again at half rate under control of the generator 34, output No. 4. The resultant total count accumulated in counter 36 and automatically fed into the digital indicator 42 at the end of $T_4$ represents a lapsed time measurement that is thus precisely proportional to the distance $D_A$ of element 18 from the end plane $t_r$ of propagative rod member 10. In this regard it will be noted from logic Equation 8 and FIG. 3 that the counting at half rate during the intra-pulse intervals $T_2$ and $T_4$ inherently accounts for the fact that the propagating wave energy pulses begin in sensing coil 28 a certain time before and persist a certain time after arrival of the maximum component at the end plane $t_p$ of rod 10, and since these times are essentially equal, the effective arrival times of the pulse peaks are determined when the accumulating counts at half rate during $T_2$ and $T_4$ represent half the pulse duration times. The digital measurement of time (and distance) is thus made to the precise pulse center points (P and Q in FIG. 3B) as desired in order to provide the measurement in relation to the exact ends $t_r$ and $t_p$ of rod 10.

In order to maintain a continuous compensating correction for any changes in the length of or propagation velocity in rod 10, counter 38 in association with programming generator 34 and controllable count frequency generator 40 provides a total length count corresponding to wave energy propagation time from end to end of rod 10. This it does by implementing the following logic equation derived by substituting above Equations 3 and 4 in Equation 6:

$$T_1 + \tfrac{3}{4}T_2 + \tfrac{1}{2}T_3 + \tfrac{1}{4}T_4 = (D_A + D_B) \div V \qquad \text{(Eq. 9)}$$

multiplied by count frequency F yields:

$$T_1F + \tfrac{3}{4}T_2F + \tfrac{1}{2}T_3F + \tfrac{1}{4}T_4F = (D_A + D_B)F \div V \qquad \text{(Eq. 10)}$$

Through control provided by sequentially acting terminals Nos. 1, 2, 3 and 4 of program sequence generator 34, the second counter 38 is caused to count successively at full rate during $T_1$, three-fourths rate during $T_2$, half rate during $T_3$ and one-fourth rate during $T_4$. Through this control logic, the total count tallied to the end of $T_4$ is proportional to the total effective rod length $D_A + D_B$. Then by making a digital comparison between this tally and a fixed (i.e., constant) reference count (corresponding to normal ambient rod length)

both fed into comparator 44, using conventional techniques, an error or correction signal proportional to the instantaneous (one cycle determined) difference yields either a "less than" or "more than" correction signal applied to variable timing pulse oscillator 40 so as to incrementally increase or decrease its frequency F. An appropriate increase in such frequency offsets or compensates for an increase in rod shock wave propagation velocity, for example, and vice-versa. Such a correction made in each cycle of timing generator 32 thereby assures that the actual physical distance $D_A$ between fixed end plane $t_r$ and the existing location of element 18 is accurately measured in the reading of indicator 42. A metering device may be added responsive to the circuit program signal from the generator's terminal No. 5 to show that the latter is functioning and that the count presented by indicator 42 is valid.

It will thus be evident that the system provides an accurate digital indication of the position of movable element 18 along a propagative member having reflective ends, and that its accuracy is unaffected by positioning of sensing transducer 48 (within limits, of course) or by the effects of temperature or other possible factors affecting the relationship between propagation time in the member between fixed points thereon represented, for example, by the end-to-end propagation time interval. These and other aspects of the invention including varying embodiments and equivalents to the novel features thereof and combinations as hereinafter claimed will be evident to those of ordinary skill in the relevant art.

What is claimed is:

1. Apparatus for gauging location of a movable element in longitudinal relation to an elongated wave energy propagative member, comprising in combination a first transducer means positionally associated with said element and operable in energy transfer relationship with said member to induce a wave energy impulse locally in said member that propagates longitudinally therein bidirectionally from the first transducer means location, drive means operable to energize said first transducer means with an impulse having a duration a minor fraction of the time required for propagation of such wave energy impulse from end to end of the member, means terminating said member at one end thereof to reflect incident wave energy therein without phase reversal, the opposite end of said member being terminated to reflect incident wave energy therein with phase reversal, second transducer means in energy transfer relationship with said member responsive to changes in energy state of said member produced by a wave energy impulse traversing said second transducer means, said second transducer means being located adjacent to and spaced from said opposite end by a distance producing additive overlapping responses therein from incident and reflected waves traversing said second transducer means so as to provide a composite single response at substantially the instant the propagating impulse arrives at said opposite end, and time interval measurement means responsively connected to said second transducer means for deriving the location of said element from time events in the occurrences of the second transducer means composite responses first from the wave energy impulse propagating to the second transducer means directly from the first transducer means and second from that propagating to such second transducer means after reflection from said one end of the member.

2. The apparatus defined in claim 1, wherein the member is of substantially uniform cross section between said ends thereof and propagates compressional wave energy impulses induced therein by the first transducer means.

3. The apparatus defined in claim 2, wherein the member is magnetostricitve and the first and second transducer means comprise magnetic induction coil elements.

4. The apparatus defined in claim 3, wherein the time interval measurement means includes an input circuit that converts said second transducer means composite responses successively into first and second substantially squared waves, and lapsed time detecting means operable in response to said waves for summing the durations of the two squared waves and the pulse spacing interval between termination of the first and inception of the second squared waves, as a measure of location of said element in relation to said one end of said member.

5. The apparatus defined in claim 4, wherein the lapsed time registering means comprises a source of constant frequency timing pulses, first counter means that counts such timing pulses, including means to count such pulses at half rate during the occurrence of each squared wave, and means to sum said half rate counts with the count at full rate during said pulse spacing interval.

6. The apparatus defined in claim 5, wherein the source is controllable to vary its timing pulse frequency, and frequency control means responsive to variations in required time for compressional wave energy to propagate from end to end of the member in relation to a constant reference value, said frequency control means being operatively connected to said source to cause increase or decrease in such timing pulse frequency in proportion respectively to decrease or increase in such required time in relation to said reference value.

7. The apparatus defined in claim 6, wherein the frequency control means includes a second counter means that also counts said timing pulses, including means to count such pulses at three-fourths rate during the occurrence of the first squared wave, at one-fourth rate during the occurrence of the second squared wave, at half rate during said pulse spacing interval and at full rate during the interval between impulse energization of the first transducer means and inception of the first squared wave, and means responsive to the difference between the sum of the aforesaid counts of said second counter means and a reference value count.

8. The apparatus defined in claim 1, wherein the time interval measurement means includes an input circuit that converts said second transducer means composite responses successively into first and second substantially squared waves, and lapsed time detecting means operable in response to said waves for summing the durations of the two squared waves and the pulse spacing interval between termination of the first and inception of the second squared waves, as a measure of location of said element in relation to said one end of said member.

9. The apparatus defined in claim 8, wherein the time interval measurement means comprises a source of constant frequency timing pulses, first counter means that counts such timing pulses, including means to count such pulses at half rate during the occurrence of each squared wave, and means to sum said half rate counts with the count at full rate during said pulse spacing interval.

10. The apparatus defined in claim 9, wherein the source is controllable to vary its timing pulse frequency, and frequency control means responsive to variations in required time for compressional wave energy to propagate from end to end of the member in relation to a constant reference value, said frequency control means being operatively connected to said source to cause increase or decrease in such timing pulse frequency in proportion respectively to decrease or increase in such required time in relation to said reference value.

11. The apparatus defined in claim 10, wherein the frequency control means includes the second counter means that also counts said timing pulses, including means to count such pulses at three-fourths rate during the occurrence of the first squared wave, at one-fourth rate during the occurrence of the second squared wave, at half rate during said pulse spacing interval and at full rate during the interval between impulse energization of the first transducer means and inception of the first squared wave, and means responsive to the difference between the sum of the aforesaid counts of said second counter means and a reference value count.

12. Apparatus for measuring required time for a wave energy impulse to propagate from end to end of an elongated propagative member utilizing a wave energy impulse induced in the member for bi-directional propagation therein at an undetermined energizing location intermediate such ends, wherein the member is terminated at one end to reflect incident wave energy therein without phase reversal and at its opposite end to reflect incident wave energy with phase reversal, transducer means in energy transfer relationship with said member responsive to a change in the energy state of the member produced by traversal of said transducer means by propagating wave energy impulse, said transducer means being located adjacent to and spaced from said opposite end by a distance producing additive overlapping responses therein from incident and reflected waves traversing said transducer means providing a composite single response at substantially the instant the propagating impulse arrives at said opposite end, and time interval measurement means responsively connected to said transducer means for converting into said required time, occurrences of the latter's composite responses first from the wave energy impulse propagating to the transducer means directly from said energizing location and second from that propogating to said transducer means after reflection from said one end of the member, said measurement means including an input circuit that converts the respective transducer means composite responses each into first and second substantially squared waves, and wherein the time interval measurement means sums the following time intervals: the full interval between wave energy impulse induction and the first squared wave, three-fourths the time duration of the first squared wave, half the interval between termination of the first squared wave and inception of the second squared wave, and one-fourth the duration of the second squared wave.

13. Apparatus for sensing variations in required time for a wave energy impulse to propagate from end to end of an elongated propagative member utilizing a wave energy impulse induced repeatedly in the member for bi-directional propagation therein at an undetermined energizing location intermediate such ends, wherein the member is terminated at one end to reflect incident wave energy therein without phase reversal and at its opposite end to reflect incident wave energy with phase reversal, transducer means in energy transfer relationship with said member responsive to a change in the energy state of the member produced by traversal of said transducer means by the propagating wave energy impulse, said transducer means being located adjacent to and spaced from said opposite end by a distance producing additive overlapping responses therein from incident and reflected waves traversing said transducer means providing a composite single response at substantially the instant the propagating impulse arrives at said opposite end, and time interval measurement means responsively connected to said transducer means for converting into said required time, occurrences of the latter's composite responses first from each wave energy impulse propagating to the transducer means directly from said energizing location and second from each propagating to said transducer means after reflection from said one end of the member, said measurement means including an input circuit that converts the respective transducer means composite responses each into first and second substantially squared waves, and wherein the time interval measurement means sums the following time intervals following each induced impulse: the full interval between wave energy impulse induction and the first squared wave, three-fourths the time duration of the first squared wave, half the interval between termination of the first squared wave and inception of the second squared wave, and one-fourth the duration of the second squared wave, and means comparing said sum with a reference value after each induced impulse to provide an output representing the difference therebetween.

* * * * *